United States Patent
Kitajima

(10) Patent No.: US 9,229,678 B2
(45) Date of Patent: Jan. 5, 2016

(54) IMAGE DISPLAY SYSTEM, IMAGE PROCESSING APPARATUS AND CONTROL METHOD THEREOF

(75) Inventor: Kotaro Kitajima, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 83 days.

(21) Appl. No.: 13/498,646

(22) PCT Filed: Jun. 22, 2011

(86) PCT No.: PCT/JP2011/064852
§ 371 (c)(1),
(2), (4) Date: Mar. 28, 2012

(87) PCT Pub. No.: WO2012/011369
PCT Pub. Date: Jan. 26, 2012

(65) Prior Publication Data
US 2013/0113683 A1    May 9, 2013

(30) Foreign Application Priority Data

Jul. 21, 2010    (JP) .................. 2010-164349

(51) Int. Cl.
*G06F 3/14* (2006.01)
*G03B 37/04* (2006.01)
*H04N 9/31* (2006.01)

(52) U.S. Cl.
CPC .............. *G06F 3/1446* (2013.01); *G03B 37/04* (2013.01); *H04N 9/3147* (2013.01); *H04N 9/3182* (2013.01); *G09G 2320/0613* (2013.01); *G09G 2320/0673* (2013.01); *G09G 2320/0686* (2013.01)

(58) Field of Classification Search
None
See application file for complete search history.

(56) References Cited

U.S. PATENT DOCUMENTS

| | | | |
|---|---|---|---|
| 6,043,797 A * | 3/2000 | Clifton et al. | ........ 345/589 |
| 6,795,063 B2 | 9/2004 | Endo et al. | |
| 6,829,664 B2 | 12/2004 | Nomizo et al. | |
| 7,002,606 B2 | 2/2006 | Tanaka et al. | |
| 7,551,175 B2 | 6/2009 | Sakanishi et al. | |
| 7,618,146 B2 | 11/2009 | Matsushita | |
| 8,379,065 B2 | 2/2013 | Nam et al. | |

(Continued)

FOREIGN PATENT DOCUMENTS

| | | |
|---|---|---|
| CN | 1430410 A | 7/2003 |
| CN | 1820504 A | 8/2006 |

(Continued)

OTHER PUBLICATIONS

Korean Office Action, which is enclosed without an English Translation, that issued in Korean Patent Application No. 10-2013-7003715.

(Continued)

*Primary Examiner* — Jason Olson
*Assistant Examiner* — Parul Gupta
(74) *Attorney, Agent, or Firm* — Cowan, Liebowitz & Latman, P.C.

(57) ABSTRACT

An image display system including a first image display apparatus, a second image display apparatus and an image processing apparatus is provided. When the first image display apparatus and the second image display apparatus each display a partial image of an image to be displayed, the first image display apparatus and the second image display apparatus each display the partial image based on a feature of the entirety of the image to be displayed.

20 Claims, 12 Drawing Sheets

(56) References Cited

U.S. PATENT DOCUMENTS

| | | | |
|---|---|---|---|
| 8,384,733 B2* | 2/2013 | Frederick et al. | 345/590 |
| 2001/0015774 A1 | 8/2001 | Endo et al. | |
| 2001/0017945 A1* | 8/2001 | Horie | 382/284 |
| 2002/0024640 A1* | 2/2002 | Ioka | 353/94 |
| 2002/0180765 A1 | 12/2002 | Tanaka et al. | |
| 2003/0126326 A1 | 7/2003 | Nomizo et al. | |
| 2006/0012759 A1 | 1/2006 | Matsushita | |
| 2007/0046698 A1 | 3/2007 | Nam et al. | |
| 2007/0257927 A1 | 11/2007 | Sakanishi et al. | |
| 2008/0112648 A1 | 5/2008 | Hatano | |
| 2010/0277502 A1 | 11/2010 | Frederick et al. | |
| 2012/0007866 A1* | 1/2012 | Tahan | 345/428 |

FOREIGN PATENT DOCUMENTS

| | | |
|---|---|---|
| CN | 1918624 A | 2/2007 |
| CN | 101184143 A | 5/2008 |
| JP | 08-317250 A | 11/1996 |
| JP | 2001-154649 A | 6/2001 |
| JP | 2002-116749 A | 4/2002 |
| JP | 2002-196717 A | 7/2002 |
| JP | 2003-015622 A | 1/2003 |
| JP | 2003-015623 A | 1/2003 |
| JP | 2004-333932 A | 11/2004 |
| JP | 2005-070080 A | 3/2005 |
| JP | 2005-286772 A | 10/2005 |
| JP | 2006-030600 A | 2/2006 |
| JP | 2006-042191 A | 2/2006 |
| JP | 2006-109035 A | 4/2006 |
| JP | 2006-235541 A | 9/2006 |
| JP | 2009-216819 A | 9/2009 |
| KR | 10-2001-0100788 A | 11/2001 |
| WO | 02/07431 A2 | 1/2002 |

OTHER PUBLICATIONS

Chinese Office Action, which is enclosed with an English Translation, that issued in Chinese Patent Application No. 201180035586.X.

Japanese Office Action, which is enclosed without an English Translation, that issued in Japanese Patent Application No. 2010-164349.

* cited by examiner

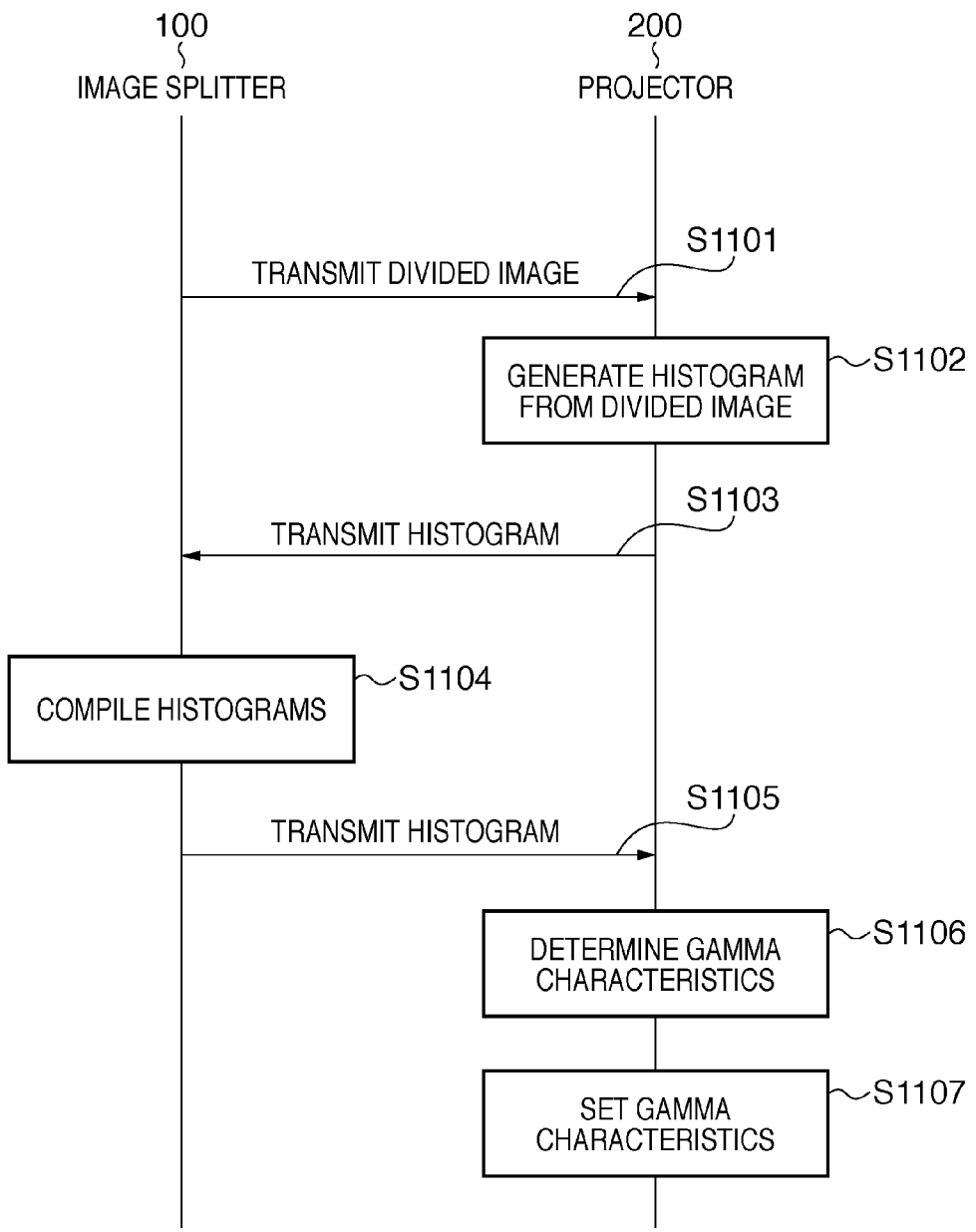

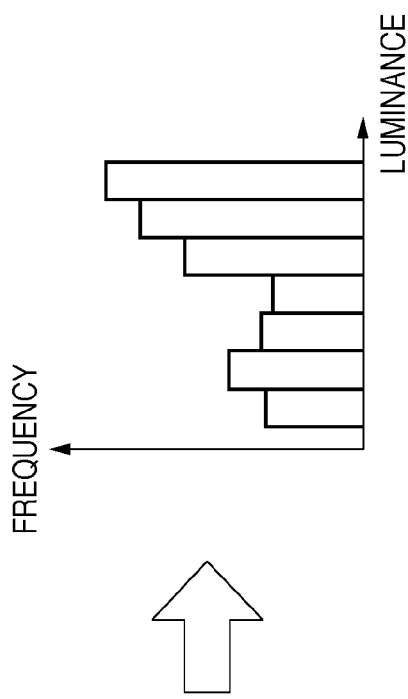
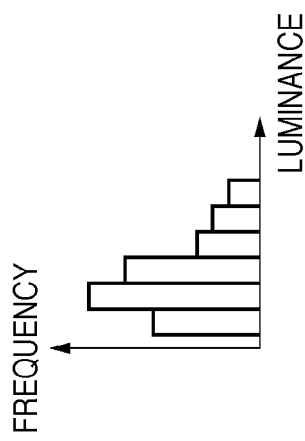
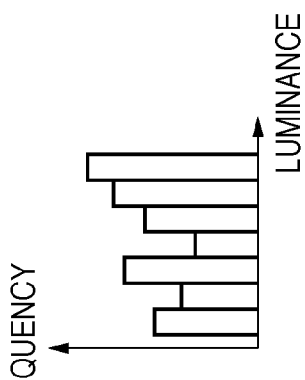
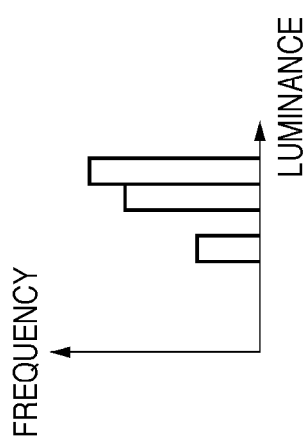
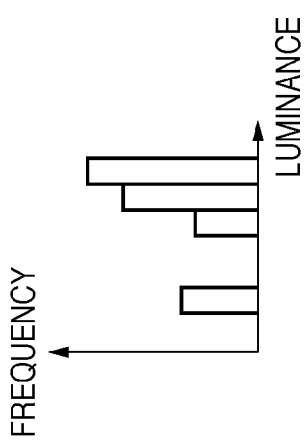

IMAGE DISPLAY SYSTEM, IMAGE PROCESSING APPARATUS AND CONTROL METHOD THEREOF

CROSS-REFERENCE TO RELATED APPLICATIONS

This application is a national stage application of International Application No. PCT/JP2011/064852, filed Jun. 22, 2011, whose benefit is claimed and which claims the benefit of Japanese Patent Application No. 2010-164349, filed Jul. 21, 2010, the entire disclosures of which are incorporated herein by reference.

TECHNICAL FIELD

The present invention relates to an image display system, an image processing apparatus and a control method thereof.

BACKGROUND ART

Conventionally, as an apparatus that displays/projects images, a projector that projects an image generated by a liquid crystal panel onto a screen is known. There is a technique for displaying a single image on a large screen using a plurality of such projectors (see, for example, Japanese Patent Laid-Open No. 2005-286772). FIG. 13 shows an example of a configuration for projecting a single image using a plurality of projectors. In FIG. 13, reference numeral 1301 indicates an image splitter, 1302 to 1305 indicate projectors, and 1306 to 1309 indicate projected images projected by the projectors 1302 to 1305. The projected images 1306 to 1309 are combined so that a single image is displayed. By using a plurality of projectors, it is possible to project high resolution large-screen images as compared to the case of using one projector.

Also, for image display apparatuses such as projectors and television sets, a technique called dynamic gamma correction for executing an optimal tone correction process for each video scene has been devised (see, for example, Japanese Patent Laid-Open No. 8-317250). This is a technique in which correction is performed on input data according to the pixel distribution in each scene and the magnitude of changes between scenes so as to visually optimize each scene image.

In the case where one projector is used, by performing a scene adaptive process such as dynamic gamma correction described above, optimal correction can be performed. However, in the case where an image is projected using a plurality of projectors as in Patent Document 1, a situation may sometimes occur in which it is not possible to perform an appropriate process on the entire image. This will be described with reference to FIG. 13 and FIGS. 14A to 14D.

In FIG. 13, the original image is divided by the splitter 1301 and input to the projectors. Each projector analyzes only an image that it will project, and performs a scene adaptive process such as dynamic gamma correction. Each projector first calculates a luminance histogram of the input image for the scene adaptive process. Examples of luminance histograms are shown in FIGS. 14A and 14B.

FIG. 14A shows an example of a luminance histogram of the image 1306 projected by the projector 1302. FIG. 14B shows an example of a luminance histogram of the image 1309 projected by the projector 1304. The projector 1302 determines gamma characteristics thereof based on the luminance histogram shown in FIG. 14A. In the case of the luminance histogram of FIG. 14A, for example, the distribution concentrates on a high luminance portion, and therefore gamma characteristics are determined such that tones in the high luminance portion are expressed. An example of the gamma characteristics is shown in FIG. 14C. Likewise, the projector 1304 determines gamma characteristics thereof based on the luminance histogram shown in FIG. 14B. In the case of the luminance histogram of FIG. 14B, the distribution concentrates on a low luminance portion, and therefore gamma characteristics are determined such that tones in the low luminance portion are expressed. An example of the gamma characteristics is shown in FIG. 14D.

As described above, in the case where each projector performs a scene adaptive process by analyzing only a divided image output from the splitter 1301, a situation occurs in which different correction processes are applied because gamma characteristics vary within one image (1306 to 1309), which results in an unnatural tone balance in the entire image.

SUMMARY OF INVENTION

The present invention addresses the problem described above. Specifically, the present invention reduces, the unnatural tone balance between images displayed by the image display apparatuses when a single image is displayed using a plurality of image display apparatuses.

According to an aspect of the present invention, there is provided an image display system including a first image display apparatus, a second image display apparatus and an image processing apparatus, the image processing apparatus comprising: dividing means for dividing an image to be displayed into a plurality of partial images; extracting means for extracting a feature of entirety of the image to be displayed; and first communication means for transmitting a first partial image obtained by the dividing means to the first image display apparatus, transmitting a second partial image that is different from the first partial image obtained by the dividing means to the second image display apparatus, and transmitting the feature extracted by the extracting means to the first image display apparatus and the second image display apparatus, the first image display apparatus comprising: second communication means for receiving the first partial image and the feature transmitted by the first communication means; and first display means for correcting the first partial image based on the feature and displaying the corrected first partial image, and the second image display apparatus comprising: third communication means for receiving the second partial image and the feature transmitted by the first communication means; and second display means for correcting the second partial image based on the feature and displaying the corrected second partial image.

According to the present invention, when a single image is displayed using a plurality of image display apparatuses, the unnatural tone balance between images displayed by the image display apparatuses can be reduced.

Further features and aspects of the present invention will become apparent from the following detailed description of exemplary embodiments with reference to the attached drawings.

BRIEF DESCRIPTION OF DRAWINGS

The accompanying drawings, which are incorporated in and constitute a part of the specification, illustrate exemplary embodiments, features, and aspects of the invention and, together with the description, serve to explain the principles of the invention.

FIG. 11 is a sequence diagram showing a procedure of determining gamma characteristics according to the third embodiment.

FIGS. 12A to 12E are diagrams illustrating a histogram combining process according to the third embodiment.

DESCRIPTION OF EMBODIMENTS

Various exemplary embodiments, features, and aspects of the invention will be described in detail below with reference to the drawings.

First Embodiment

In the present embodiment, a description will be given of an image display system including a plurality of projectors serving as an image display apparatus equipped with a built-in liquid crystal panel and an image processing apparatus that supplies images to the projectors.

Figure 1:
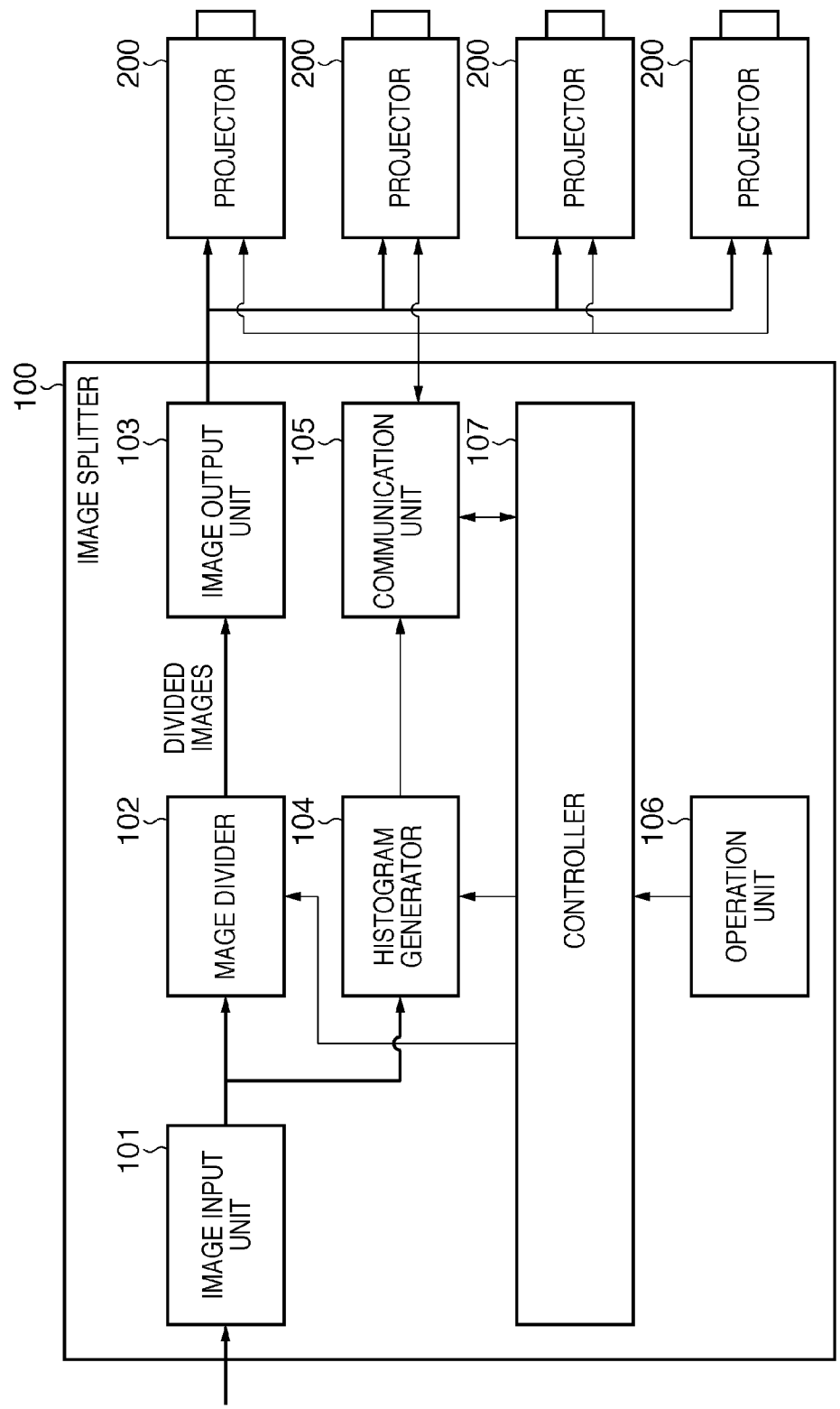
FIG. 1 is a block diagram showing a configuration of an image splitter according to a first embodiment.

FIG. 1 shows a configuration of an image splitter 100 serving as an image processing apparatus. The image splitter 100 divides an original image to be displayed into a plurality of images and distributes/outputs each divided image to the corresponding projector. In FIG. 1, reference numeral 101 indicates an image input unit that receives input of video signals from a personal computer (PC), a DVD player, a digital camera and the like. The image input unit 101 is composed of, for example, an HDMI terminal or the like. Reference numeral 102 indicates an image divider, 103 indicates an image output unit, 104 indicates a histogram generator, and 105 indicates a communication unit that transmits and receives control signals. Reference numeral 106 indicates an operation unit that receives user operations, 107 indicates a controller that performs overall control of the image splitter. Reference numeral 200 indicates projectors connected to the image splitter 100.

Figure 2:
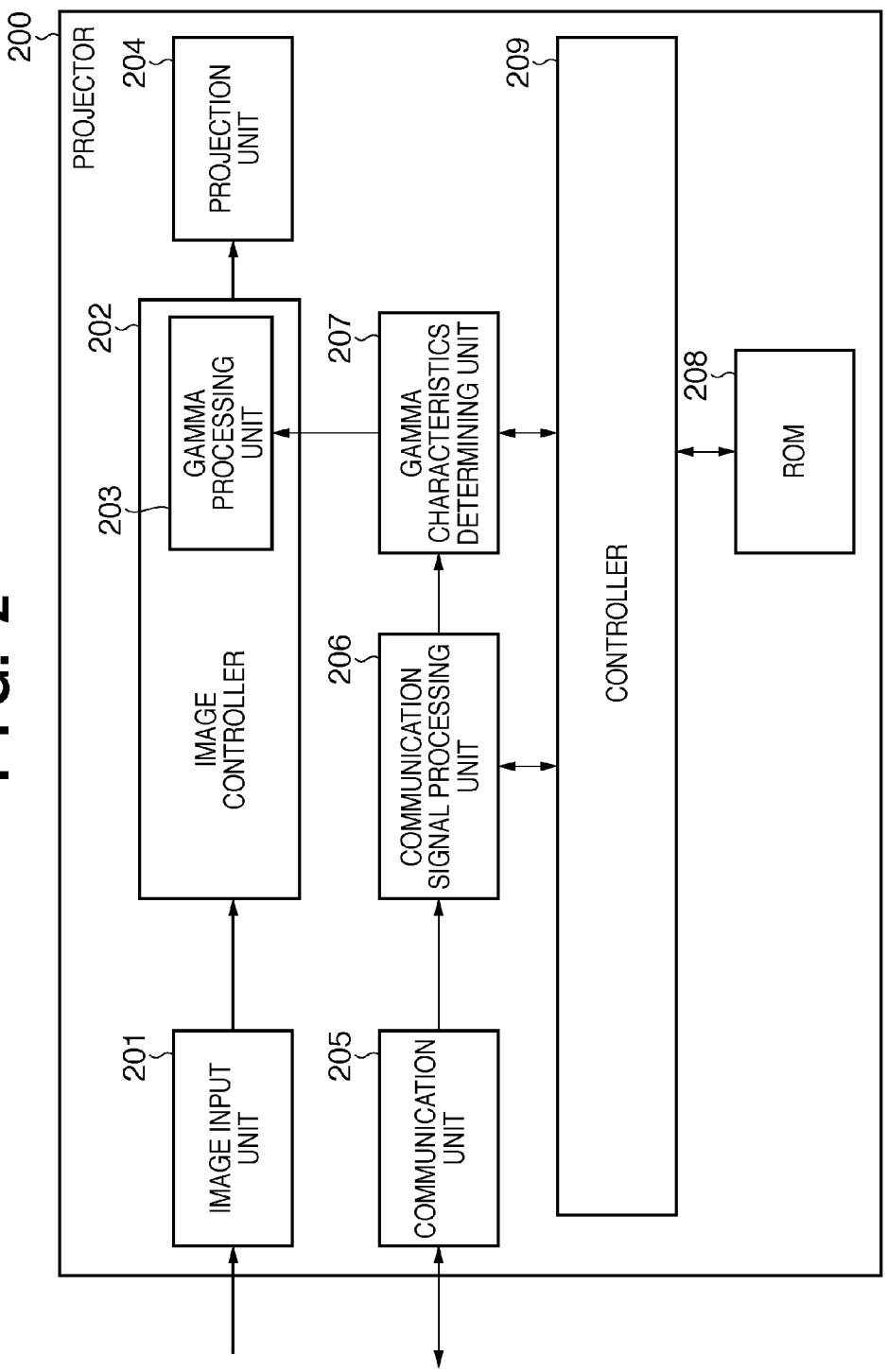
FIG. 2 is a block diagram showing a configuration of a projector according to the first embodiment.

FIG. 2 shows a configuration of a projector 200. In FIG. 2, reference numeral 201 indicates an image input unit that receives input of a video signal output from the image splitter 100, and 202 indicates an image controller. The image controller 202 includes a gamma processing unit 203. Reference numeral 204 indicates a projection unit and includes a liquid crystal panel, a liquid crystal driving unit, a light source and so on. Reference numeral 205 indicates a communication unit that transmits and receives a control signal to and from the image splitter 100, 206 indicates a communication signal processing unit that separates and analyzes a communication signal, and 207 indicates a gamma characteristics determining unit that determines characteristics for gamma processing. Reference numeral 208 indicates a ROM, and 209 indicates a controller that performs overall control of the projector.

Figure 3:
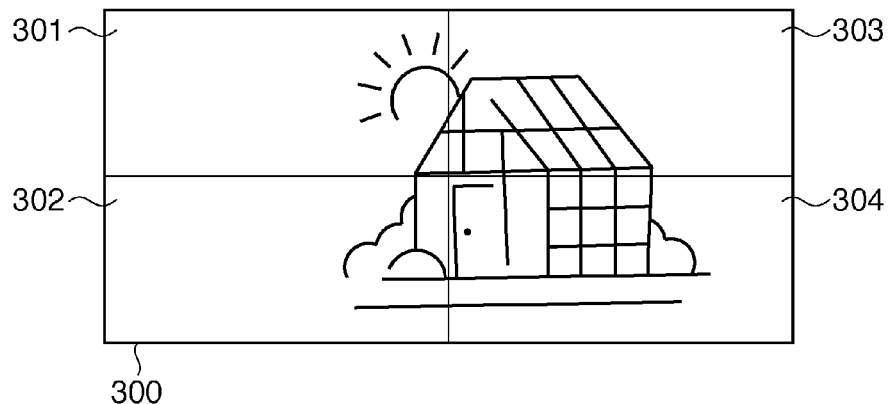
FIG. 3 is a diagram illustrating an example in which an input image is divided into four.

Next, operations of the image splitter 100 and the projectors 200 will be described. An initialization process upon startup will be described first. As the initialization process, the controller 107 of the image splitter 100 sets the number of partial images into which an image should be divided (hereinafter referred to as the number of divisions) and corrects differences in luminance between the connected projectors. Setting of the number of divisions will be described first. The operation unit 106 receives, from the user, an operation to set the number of divisions. Upon receiving information regarding the number of divisions, the controller 107 sets the information regarding the number of divisions in the image divider 102. The present embodiment will be described taking an example in which the input image is divided into four. FIG. 3 shows an example in which one image is divided into four. In FIG. 3, reference numeral 300 indicates an input image, and 301 to 304 each indicate a divided partial image. When the operation unit 106 receives an operation to divide an image into four from the user, the controller 107 sets the image divider 102 so as to divide the image into four as shown in FIG. 3.

Figure 4:
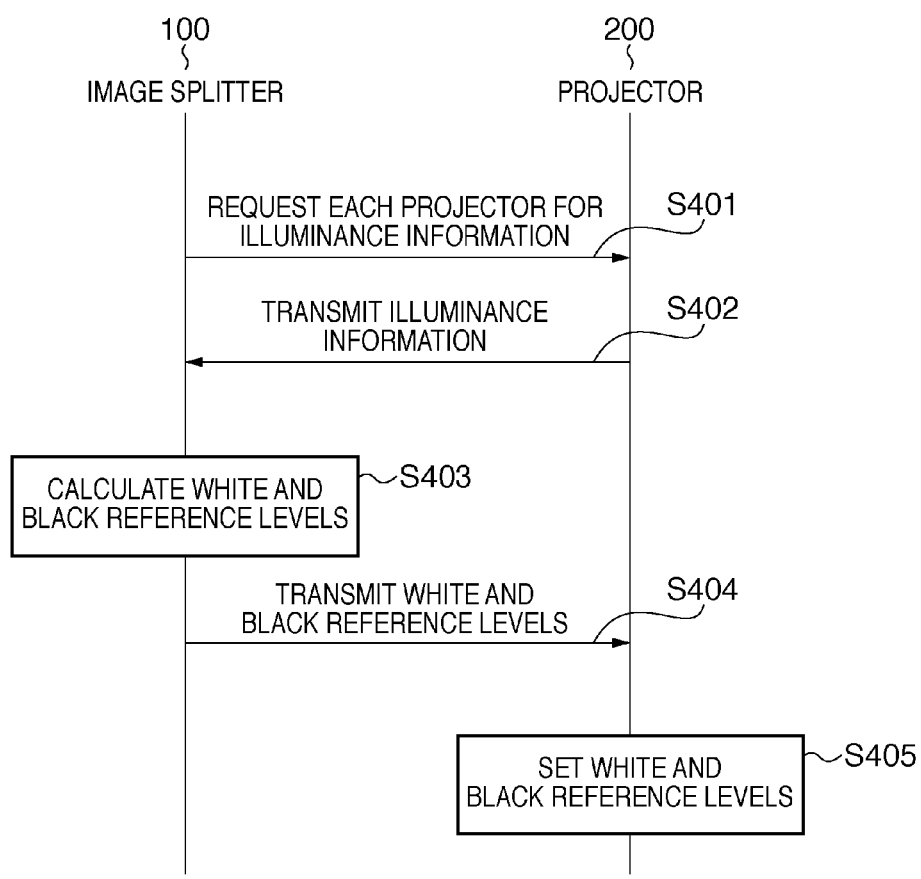
FIG. 4 is a sequence diagram showing a process for setting white and black reference levels according to the first embodiment.

Next, a process of correcting differences in luminance between the four projectors 200 connected to the image splitter 100 will be described with reference to FIG. 4. FIG. 4 is a sequence diagram showing a process of correcting differences in luminance between the projectors 200. The image splitter 100 and the projectors 200 perform communication using their own communication unit 105, 205, and perform the following control process using their own controller 107, 209.

In S401, the image splitter 100 sends a request to transmit illuminance information to the connected projectors. The illuminance information as used herein refers to illuminance (for example, numerical values expressed in lumen) information when an all-white video image is projected (displayed) and when an all-black video image is projected (displayed). In S402, each projector 200 (four projectors in the present embodiment) transmits its own illuminance information to the image splitter 100. Each projector 200 stores the illuminance information recorded at the time of production in the ROM 208 and transmits the illuminance information to the image splitter 100. In S403, the image splitter 100 calculates white and black reference levels based on the illuminance information received from each projector 200.

Figure 5:
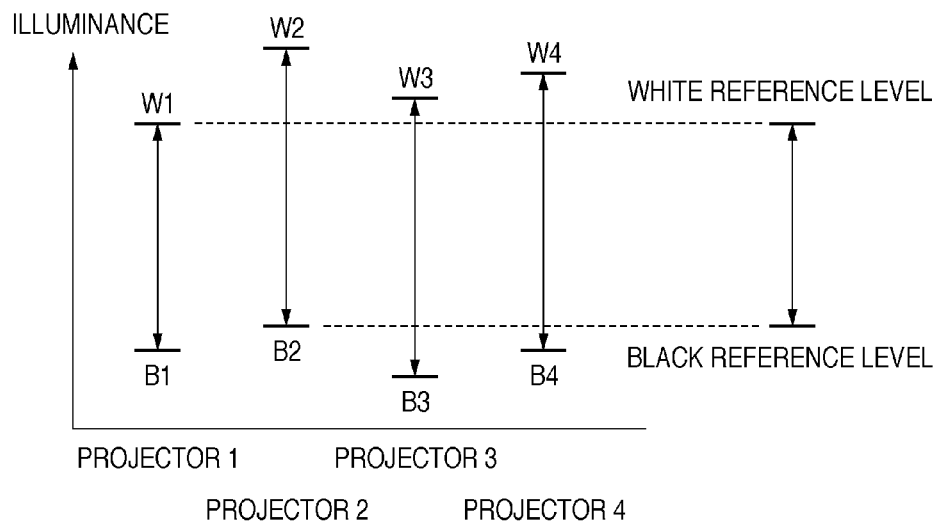
FIG. 5 is a diagram illustrating a method of calculating white and black reference levels according to the first embodiment.

A method of calculating the white and black reference levels will be described with reference to FIG. 5. FIG. 5 is a diagram showing the illuminance information of the four projectors. In FIG. 5, W1 to W4 indicate the illuminance of the projectors 1 to 4 when an all-white video image is projected. B1 to B4 indicate the illuminance of the projectors 1 to 4 when an all-black video image is projected. At this time, the illuminance of the projector having the smallest illuminance when an all-white video image is projected is determined as the white reference level. In the case of the example shown in FIG. 5, the projector 1 has the lowest illuminance when an all-white video image is projected, and thus the illuminance W1 is determined as the white reference level. Next, as the black reference level, the illuminance of the projector having the largest illuminance when an all-black video image is projected is determined. In the case of the example shown in FIG. 5, the projector 2 has the highest illuminance when an all-black video image is projected, and thus the illuminance B2 is determined as the black reference level.

In S404, the white and black reference levels calculated in the manner above described are notified to each projector. In S405, each projector sets the notified white and black reference levels as the white and black reference levels used to display the image. The white and black reference levels are shared by the projectors as described above, and therefore variations in the illuminance level caused due to individual differences between projectors can be suppressed.

The initialization process upon startup has been described above. Next, operations when an image is input will be described. In the image splitter 100 of FIG. 1, the image input unit 101 receives an input image from an external device. In the present embodiment, it is assumed that this input image is the original image to be displayed. The image input unit 101 outputs the input image to the image divider 102 and the histogram generator 104. The image divider 102 divides the input image according to the number of divisions, which has been set during initialization. Here, as shown in FIG. 3, the input image 300 is divided into four images 301 to 304. Then, the four divided images are output to the image output unit 103. The image output unit 103 is connected to the four projectors 200, and transmits the divided images 301 to 304 to the four projectors. On the other hand, the histogram generator 104 calculates a luminance histogram from the entire input image 300. The luminance histogram shows the feature of the entire original image. The data regarding the calculated luminance histogram is output to the communication unit 105, and the communication unit 105 transmits the luminance histogram data to all of the connected projectors.

Figure 6:
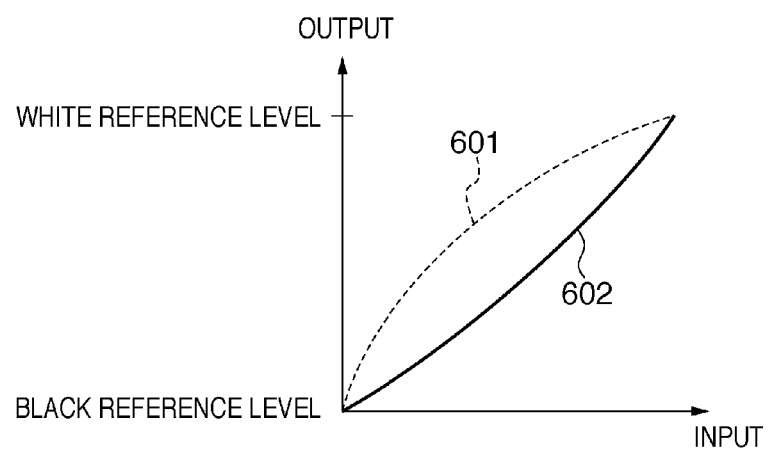
FIG. 6 is a diagram illustrating determination of gamma characteristics according to the first embodiment.

Operations of each projector 200 will be described next. The communication unit 205 performs communication with the communication unit 105 of the image splitter 100. The communication unit 205 outputs the received signal to the communication signal processing unit 206. The communication signal processing unit 206 performs separation and analysis of the signal. Specifically, the communication signal processing unit 206 separates the luminance histogram data transmitted from the image splitter 100 from the input signal, and outputs the luminance histogram information to the gamma characteristics determining unit 207. The gamma characteristics determining unit 207 determines a gamma characteristics correction amount based on the luminance histogram information. How to determine gamma characteristics will be described with reference to FIG. 6. FIG. 6 is a diagram showing an example of gamma characteristics and shows input/output characteristics of the luminance signal. For example, if it is determined from the luminance histogram of the input image that the input image is a dark scene (the distribution concentrates on a low luminance portion), as indicated by 601, gamma characteristics are determined such that tones in the black portion are expressed. If, on the other hand, it is determined from the histogram of the input image that the input image is a bright scene (the distribution concentrates on a high luminance portion), as indicated by 602, gamma characteristics are determined such that tones are expressed without compromising the high luminance portion. The determined gamma characteristics are output to the gamma processing unit 203. The relationship between luminance histogram and gamma characteristics is common to the projectors, and thus common gamma characteristics are determined for the projectors that have received the same luminance histogram. Accordingly, in the present embodiment, the gamma characteristics (correction amount) are common to all of the four projectors.

On the other hand, the image input unit 201 receives input of one of the divided images output from the image splitter 100, and outputs the input image to the image controller 202. The image controller 202 performs various types of image processing on the input image such as noise removal and contour enhancement. The gamma processing unit 203 of the image controller 202 corrects the gamma characteristics determined by the gamma characteristics determining unit 207, or in other words, gamma correction is performed. The image data processed in the image controller 202 is output to the projection unit 204. The projection unit 204 forms an image on a liquid crystal panel (not shown). Then, the image formed on the liquid crystal panel is projected onto a screen surface by light emitted from the light source (not shown).

The foregoing has described an image display system of the present embodiment including an image splitter that divides and distributes an input image and a plurality of projectors that project the image. The image splitter of the present embodiment generates a luminance histogram from the entire original image before dividing and transmits the luminance histogram data to each projector. Each projector determines gamma characteristics based on the received luminance histogram data and projects the gamma corrected image.

With this configuration, processing can be performed using gamma characteristics common to all of the projectors according to the characteristics of the entire image before dividing. As a result, it is possible to reduce the possibility that the gamma varies at different portions in one screen and as a result the tone balance becomes unnatural in the entire image.

In the present embodiment, a configuration in which the image splitter 100 generates the luminance histogram of an input image and transmits the luminance histogram data to each projector has been described, but the present invention is not limited to this configuration. It is also possible to acquire information indicating other image features instead of the luminance histogram, and determine gamma characteristics according to the information. For example, gamma characteristics can be determined using brightness information of the entire image or the like. Also, in the present embodiment, each projector 200 determines gamma characteristics based on the luminance histogram, but it is also possible to employ a configuration in which the image splitter 100 determines gamma characteristics based on the luminance histogram and transmits the gamma characteristics to each projector 200.

Also, the present embodiment has been described using gamma processing as an example of the scene adaptive process, but the present embodiment can be applied to processing other than gamma processing as long as it is a process that adaptively processes an image by analyzing characteristics of the image. For example, the present embodiment can be applied to color processing, contour enhancement, noise removal and the like. In the case of color processing, a saturation histogram is calculated instead of the luminance histogram. If the image has a high saturation, control is performed to express color tones in a high saturation portion. It is thereby possible to prevent the high saturation portion from being compromised. In the case of contour enhancement, a histogram of frequency characteristics is calculated. If the image has a large number of high frequency components, control is performed to reinforce contour enhancement. It is thereby possible to increase the perceived resolution of the image. In the case of noise removal, a difference histogram between image frames is calculated, and it is analyzed whether there is a temporal movement between images. If there is no movement between images, a low pass filter is applied in the temporal direction to remove noise. If, on the other hand, there is a movement between images, a low pass filter is applied in the spatial direction because image lag occurs if the filter is applied in the temporal direction. By performing noise removal so as to adapt to the movement between images, the effect of noise removal can be improved.

As described above, any configuration and process can be used as long as image processing characteristics are determined by analyzing the entire image before dividing, and common image processing is performed in the projectors.

In the present embodiment, an example has been described in which the luminance levels of a plurality of projectors are matched during initialization, but in addition to the luminance, color levels may be matched. By matching the color levels as well, the colors of the projectors can be matched when the color adaptive process described above is performed.

Also, in the present embodiment, an example has been described in which the image splitter 100 and the projectors 200 are separate apparatuses, but one of the projectors 200 may have the configuration of the image splitter.

Also, in the present embodiment, an example has been described in which four projectors are connected and input image data is divided into four, but the present invention is not limited to a specific number of projectors, and any number of projectors can be used as long as a plurality of projectors are used.

Also, in the present embodiment, an example has been described in which projectors are used as image display apparatuses, but the present invention is not limited to specific image display apparatuses. The present invention is applicable to any image display apparatuses other than projectors, such as television sets and display apparatuses.

Second Embodiment

In the first embodiment, an example has been described in which the image splitter generates feature information of an image such as a histogram and transmits the image feature information to each projector. In the present embodiment, an example will be described in which an image splitter reduces the size of an input image and transmits the reduced image to each projector instead of the histogram.

Figure 7:
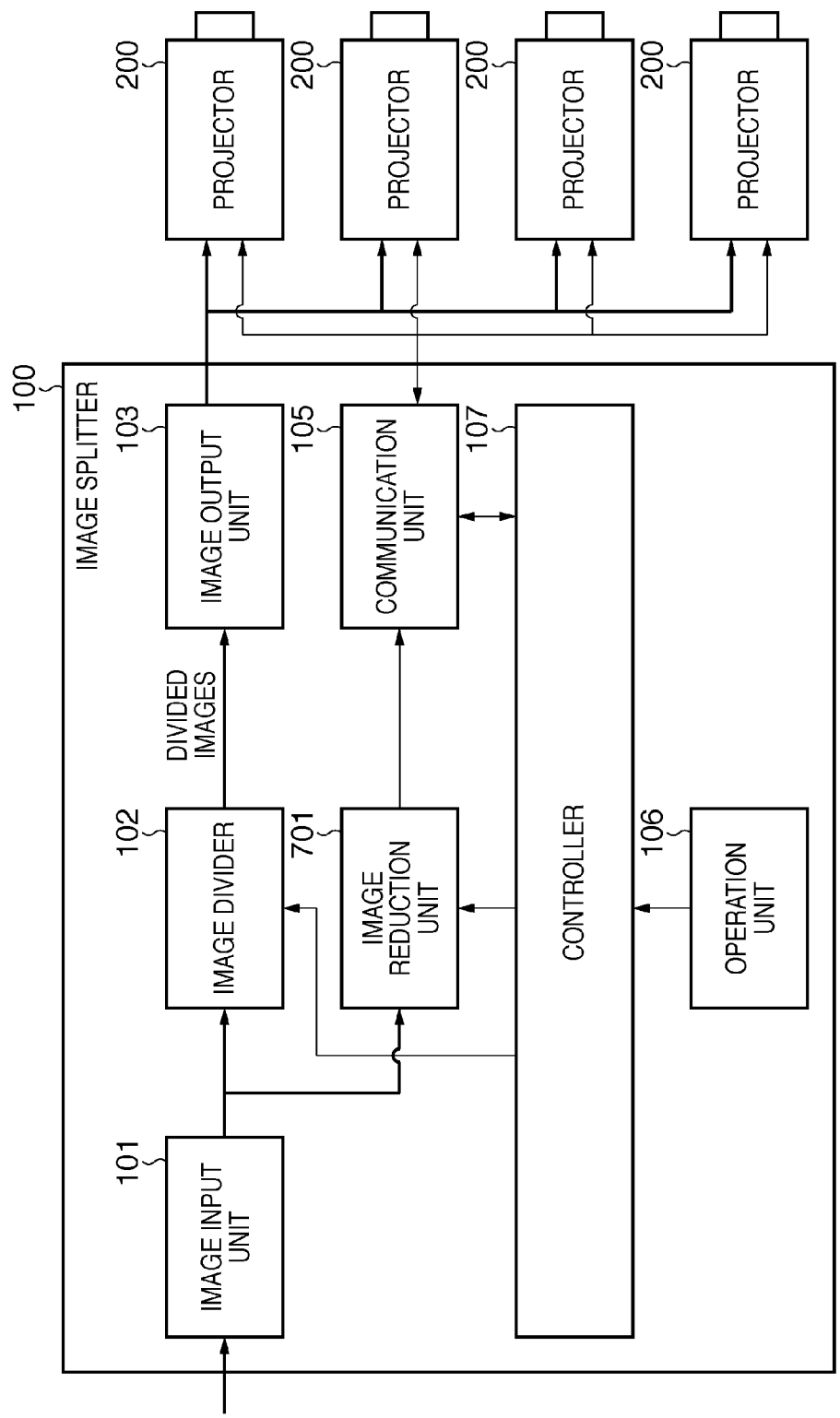
FIG. 7 is a block diagram showing a configuration of an image splitter according to a second embodiment.
Figure 8:
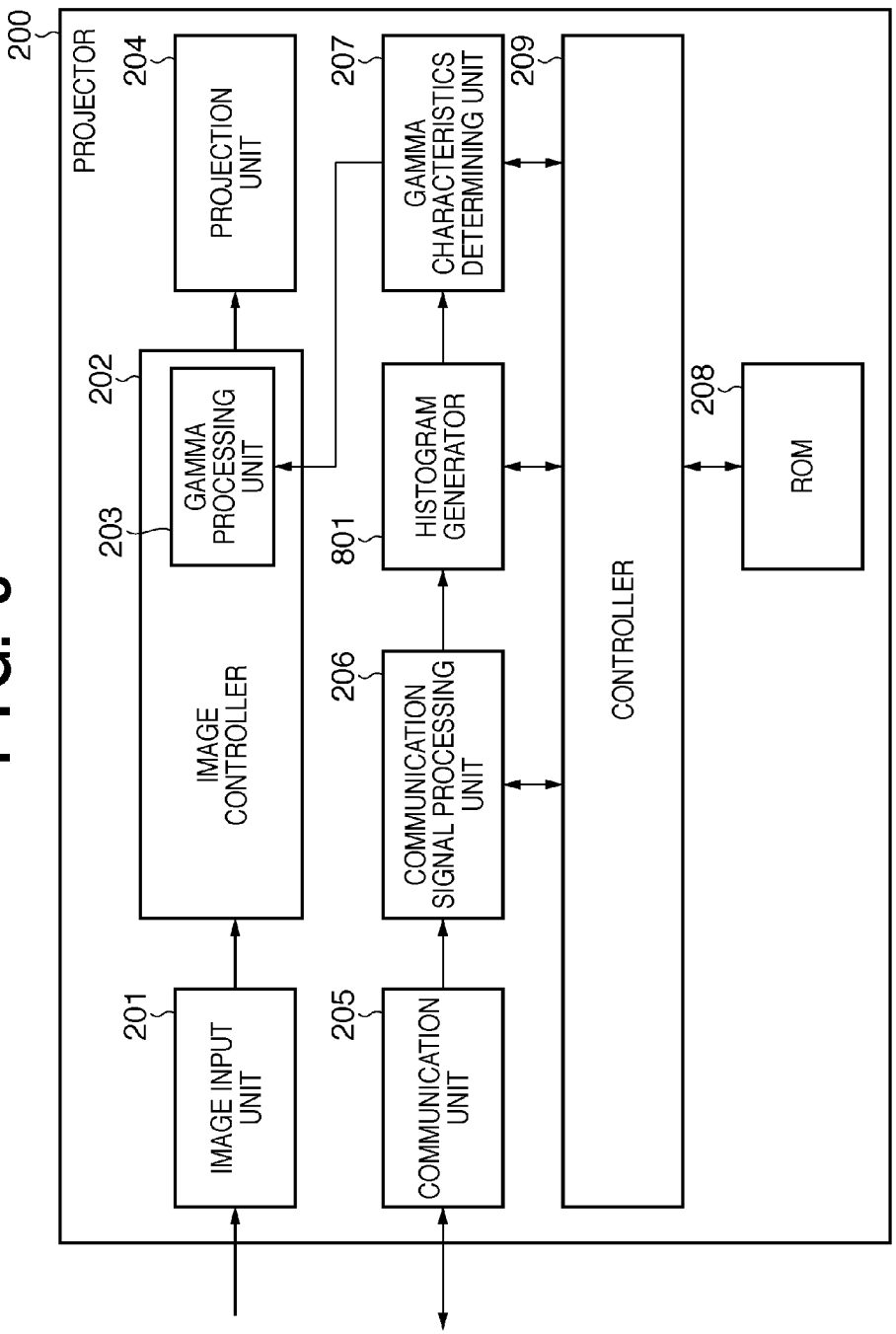
FIG. 8 is a block diagram showing a configuration of a projector according to the second embodiment.

FIG. 7 is a block diagrams showing a configuration of an image splitter 100 according to the present embodiment, and FIG. 8 is a block diagram showing a configuration of a projector 200 according to the present embodiment. The same reference numerals are given to constituent elements that are the same as those of FIGS. 1 and 2, and thus descriptions thereof are omitted here. The image splitter 100 shown in FIG. 7 is different from the image splitter of the first embodiment (FIG. 1) in that it includes an image reduction unit 701 instead of the histogram generator 104. The projector shown in FIG. 8 is difference from the projector of the first embodiment (FIG. 2) in that it includes a histogram generator 801.

Operations of an image display system configured as described above will be described next. The initialization process performed by the image splitter 100 and the connected projectors 200 is the same as that of the first embodiment, and thus a description thereof is omitted here. Also, the process of dividing input image data and outputting the divided images to the projectors 200 performed by the image splitter 100 shown in FIG. 7 is also the same as that of the first embodiment, and thus a description thereof is omitted here.

In the present embodiment, the input image data that has been input by the image input unit 101 is output to the image reduction unit 701. The image reduction unit 701 reduces the size of the input image by a factor of 10. The reduced image is output to the communication unit 105, and the communication unit 105 transmits the reduced image to each projector 200.

The process of performing image processing on the input image and projecting the image-processed image onto a screen (not shown) performed by the projector 200 shown in FIG. 8 is the same as that described in the first embodiment, and thus a description thereof is omitted here. In the present embodiment, the communication unit 205 receives a signal including the reduced image from the image splitter 100, and outputs the signal to the communication signal processing unit 206. The communication signal processing unit 206 separates the reduced image from the received signal and outputs the reduced image to the histogram generator 801. The histogram generator 801 generates a luminance histogram from the reduced image, and outputs the luminance histogram to the gamma characteristics determining unit 207. The gamma characteristics determining unit 207 determines gamma characteristics based on the luminance histogram as in the first embodiment, and outputs the gamma characteristics to the gamma processing unit 203.

As described above, in the image display system of the present embodiment, the image splitter 100 reduces the size of an input image before dividing and outputs the reduced image to each projector 200. Each projector generates a luminance histogram from the reduced image, and determines gamma characteristics based on the generated luminance histogram. With this configuration, each projector can perform a scene adaptive process according to not only the characteristics of the divided image input thereinto but also to the characteristics of the entire image. Also, because the input image is reduced before dividing, and the reduced image is transmitted to each projector, communication is possible with a small amount of information as compared to the case where the entire input image is transmitted to each projector.

In the above embodiment, the reduced image is transmitted to the projectors 200, but the input image can be transformed to any information as long as the amount of information of the input image can be reduced. For example, it is possible to use a configuration in which an image obtained by reducing the number of tones of the input image is transmitted to the projectors.

Also, in the present embodiment, an example has been described in which projectors are used as image display apparatuses, but the present embodiment can be applied to any image display apparatuses. The present embodiment can be applied to, for example, television sets or the like.

Third Embodiment

Figure 9:
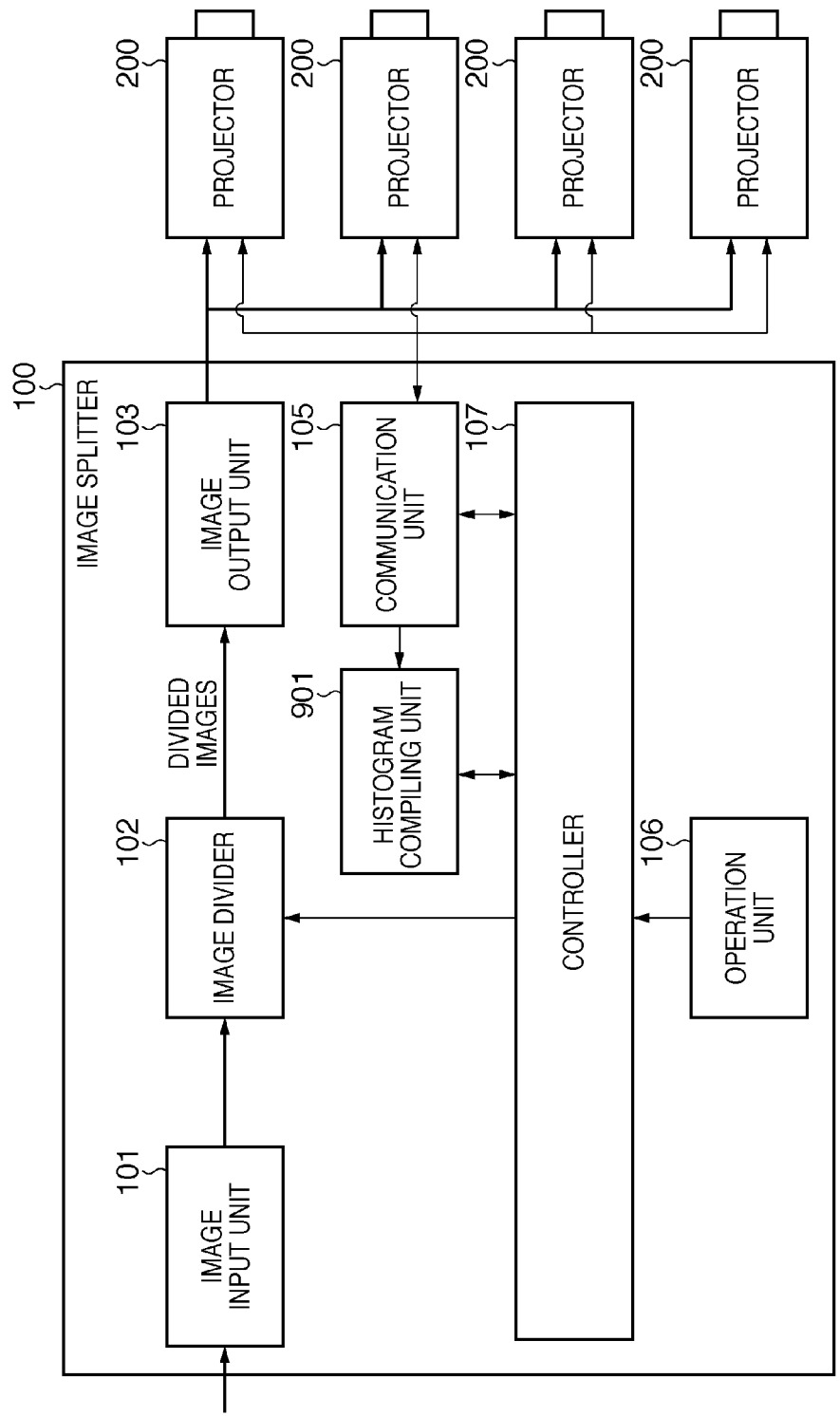
FIG. 9 is a block diagram showing a configuration of an image splitter according to a third embodiment.
Figure 10:
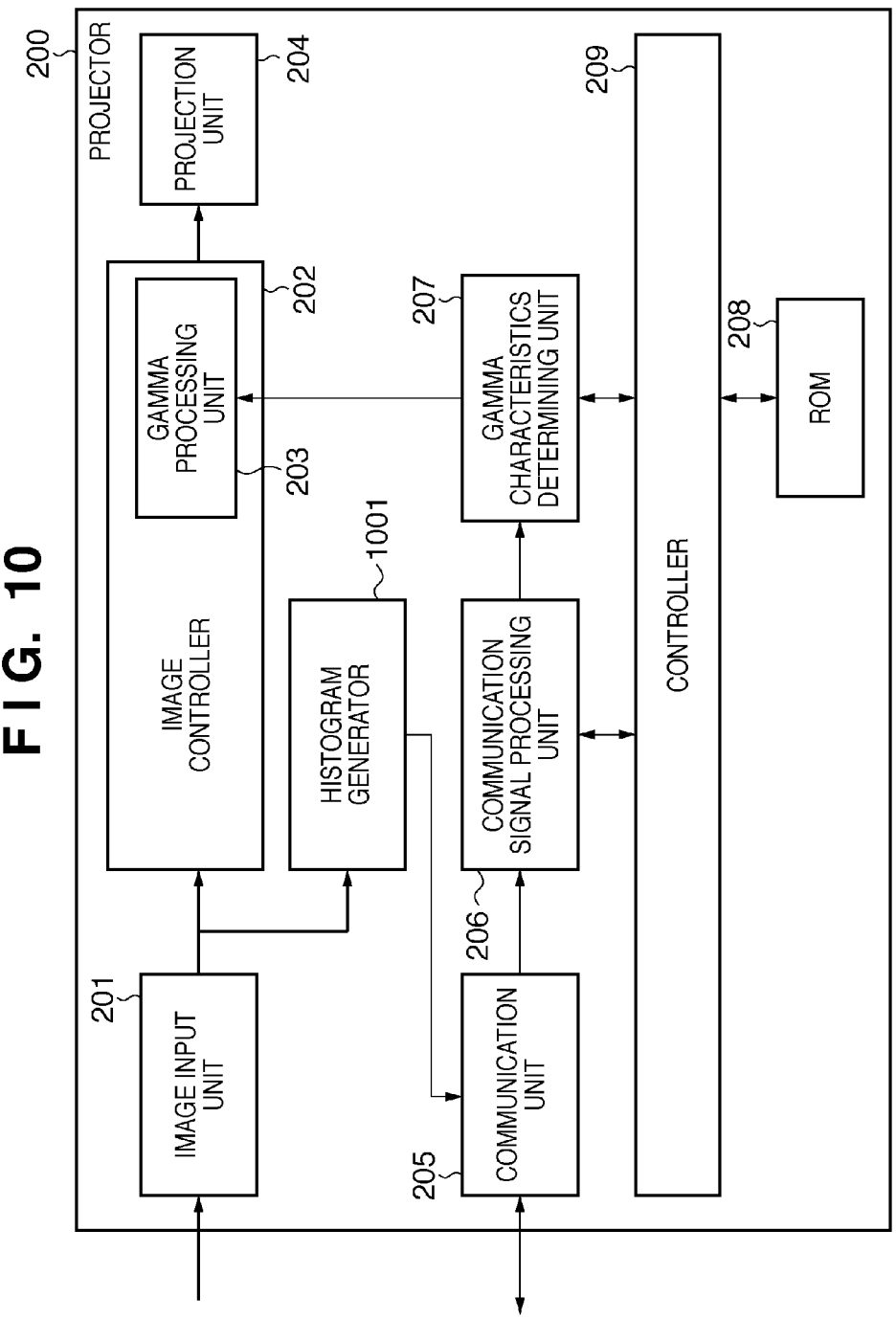
FIG. 10 is a block diagram showing a configuration of a projector according to the third embodiment.
Figure 13:
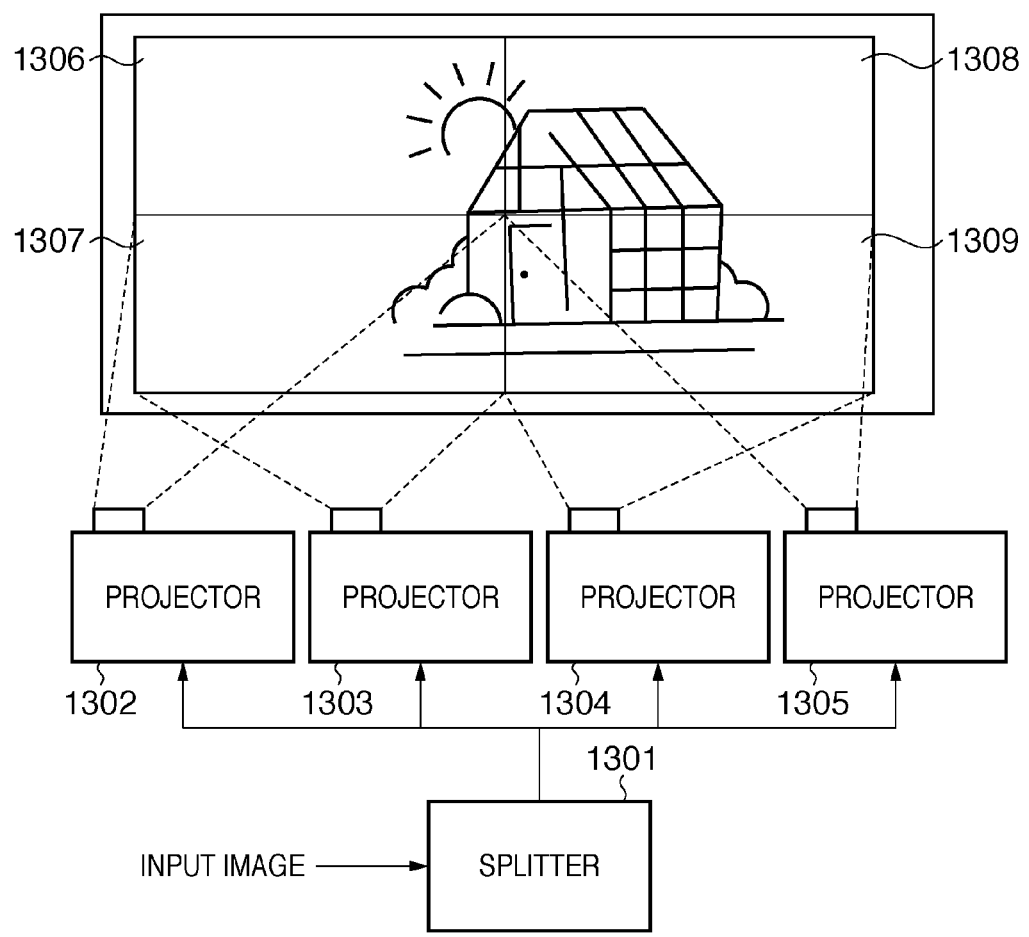
FIG. 13 is a diagram showing an example of a configuration for projecting a single image using a plurality of projectors.
Figure 14A:
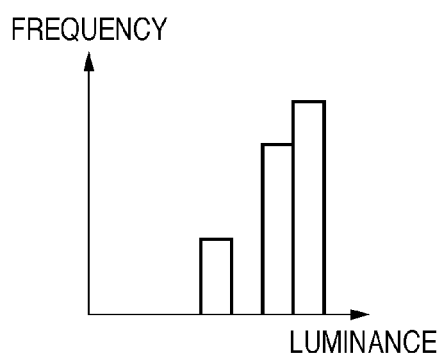
FIGS. 14A and 14B are diagrams showing examples of luminance histograms.
Figure 14B:
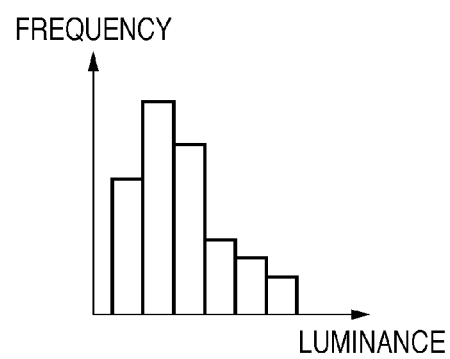
Figure 14C:
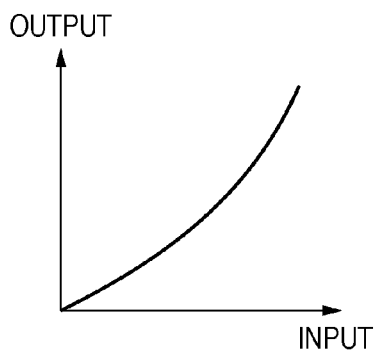
FIGS. 14C and 14D are diagrams showing examples of gamma characteristics determined with respect to the luminance histograms shown in FIGS. 14A and 14B.
Figure 14D:
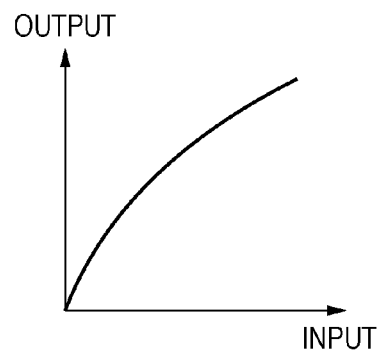

In the present embodiment, an example will be described in which each projector generates a histogram based on a divided image, and an image splitter compiles the histograms and determines gamma characteristics. FIG. 9 is a block diagram showing a configuration of an image splitter 100 according to the present embodiment, and FIG. 10 is a block diagram showing a configuration of a projector 200 according to the present embodiment. The same reference numerals are given to constituent elements that are the same as those of FIGS. 1 and 2, and thus descriptions thereof are omitted here.

The image splitter 100 shown in FIG. 9 is different from the image splitter of the first embodiment (FIG. 1) in that it includes a histogram compiling unit 901 instead of the histogram generator 104. The projector shown in FIG. 10 is different from the projector of the first embodiment (FIG. 2) in that it includes a histogram generator 1001.

Operations of an image display system configured as described above will be described next. The initialization process performed by the image splitter 100 and the connected projectors 200 is the same as that of the first embodiment, and thus a description thereof is omitted here. Also, the process of dividing input image data and outputting the divided images to the projectors 200, performed by the image splitter 100 shown in FIG. 9 is also the same as that of the first embodiment, and thus a description thereof is omitted here. Also, the process of performing image processing on the input image and projecting the image-processed image onto a screen (not shown) performed by the projector 200 shown in FIG. 10 is also the same as that of the first embodiment, and thus a description thereof is omitted here.

The present embodiment is different from the first embodiment in terms of the method of determining gamma characteristics set in the gamma processing unit 203. Hereinafter, a gamma characteristics setting process of the present embodiment will be described with reference to the sequence diagram shown in FIG. 11. In FIG. 11, in S1101, a divided image made by the image divider 102 is output to each projector 200 via the image output unit 103 in the same manner as described above. In S1102, the projector 200 generates a luminance histogram from the input divided image. Specifically, the divided image data from the image splitter 100 is input to the histogram generator 1001 of the projector 200. The histogram generator 1001 generates a luminance histogram from the divided image (for example, 301 of FIG. 3). In S1103, the generated luminance histogram is returned from the communication unit 205 to the image splitter 100.

In S1104, the histogram compiling unit 901 of the image splitter 100 compiles the histogram data. Here, the luminance histogram data transmitted from each of the four connected projectors is input to the histogram compiling unit 901 via the communication unit 105. The histogram compiling unit 901 combines all of the input histogram frequencies into one histogram data. This will be described with reference to FIGS. 12A to 12E. FIGS. 12A to 12D each show the histogram of each divided image, and FIG. 12E shows a histogram as the combined feature obtained by adding up all of the four histogram frequencies. This is equivalent to the histogram of the input image input to the image splitter 100.

In S1105, the histogram compiling unit 901 transfers the compiled histogram information to each projector 200 via the image output unit 103. In S1106, the gamma characteristics determining unit 207 of each projector 200 determines gamma characteristics based on the compiled histogram. Specifically, the compiled histogram (FIG. 12E) received via the communication unit 205 is input to the gamma characteristics determining unit 207, and the gamma characteristics determining unit 207 determines gamma characteristics. The method of determining gamma characteristics is the same as that performed by the gamma characteristics determining unit 207 of the first embodiment. Then, in S1107, the determined gamma characteristics are set in the gamma processing unit 203. This is the procedure of gamma characteristics setting process. The gamma processing unit 203 performs gamma processing based on the gamma characteristics set in this procedure, and the projection unit 204 projects the image.

As described above, in the image display system of the present embodiment, each projector generates the histogram of a divided image, and outputs the histogram to the image splitter 100. The image splitter 100 compiles the histograms of the divided images. Then, the compiled histogram is transmitted to the projectors 200, and the projectors 200 determine gamma characteristics based on the acquired histogram.

With a configuration in which the histogram generation process is performed by each projector in the manner described above, the load of the image splitter to analyze a high resolution image can be reduced. Also, the effects that the projectors can perform a common scene adaptive process and the unnatural tone balance between images can be reduced are the same as those of the first and second embodiments.

In the present embodiment, an example has been described in which the projectors 200 determine gamma characteristics, but the image splitter 100 may determine gamma characteristics. In this case, the gamma characteristics determining unit 207 of the projectors 200 is removed, and instead a gamma characteristics determining unit is provided in the image splitter 100. In the image splitter 100, the luminance histogram compiled by the histogram compiling unit 901 is input to the gamma characteristics determining unit to determine gamma characteristics. Then, the determined gamma characteristics information is output from the communication unit 105 to the projectors 200. The projectors 200 set the gamma characteristics information received by the communication unit 205 in the gamma processing unit 203. With this configuration, the projectors 200 do not need to determine gamma characteristics, and thus the processing load required to determine gamma characteristics can be reduced.

Also, in the present embodiment, an example has been described in which each projector 200 transmits luminance histogram data to the image splitter 100, but any information, other than histogram information, can be used as long as the information indicates the characteristics of the divided image input to the projector. For example, each projector may calculate information such as the average luminance, the highest luminance value and the lowest luminance value of the divided image and transmit the information to the image splitter 100. In this case, the histogram compiling unit 901 of the image splitter 100 further calculates the average luminance, the highest luminance value and the lowest luminance value from the information transmitted from each projector (in this case, the average luminances, highest luminance values and lowest luminance values of the four projectors). Then, the gamma characteristics determining unit 207 determines gamma characteristics based on the information. As the method of determining gamma characteristics, for example, if the highest luminance value is large, the gamma characteristics determining unit 207 determines gamma characteristics such that the tonality of high luminance becomes high, whereby the amount of information can be reduced as compared to the case where histogram information is communicated.

Also, in the present embodiment, an example has been described in which projectors are used as image display apparatuses, but the present embodiment is applicable to any image display apparatuses such as television sets.

The first to third embodiments may be used in an appropriate combination.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No 2010-164349, filed on Jul. 21, 2010, which is hereby incorporated by reference herein in its entirety.

The invention claimed is:

1. A display system comprising:
 a first display apparatus;
 a second display apparatus; and
 an image processing apparatus,
 wherein the image processing apparatus includes:
 a first generating means for generating partial images from an entire image to be displayed;
 a second generating means for generating a reduced image by reducing the entire image to be displayed; and
 a communication means for transmitting a first partial image to the first display apparatus, transmitting a second partial image that is different from the first partial image to the second display apparatus, and transmitting the reduced image to the first display apparatus and the second display apparatus,
 wherein the first display apparatus is configured to receive the first partial image from the image processing apparatus, receive the reduced image from the image processing apparatus, use the reduced image to process the first partial image, and display the processed first partial image,
 wherein the second display apparatus is configured to receive the second partial image from the image processing apparatus, receive the reduced image from the image processing apparatus, use the reduced image to process the second partial image, and display the processed second partial image,
 wherein the image processing apparatus includes controlling means for controlling a white reference level and a black reference level of the first display apparatus and a white reference level and a black reference level of the second display apparatus, using first information relating to a display capability of the first display apparatus and second information relating to a display capability of the second display apparatus, and
 wherein the first information is transmitted from the first display apparatus to the image processing apparatus, and the second information is transmitted from the second display apparatus to the image processing apparatus.

2. The display system according to claim 1, wherein the first display apparatus is configured to use the reduced image to adjust gamma characteristics of the first partial image, and
 wherein the second display apparatus is configured to use the reduced image to adjust gamma characteristics of the second partial image.

3. The display system according to claim 1, wherein the first display apparatus is configured to use the reduced image to adjust tone characteristics of the first partial image, and
 wherein the second display apparatus is configured to use the reduced image to adjust tone characteristics of the second partial image.

4. The display system according to claim 1, wherein after the controlling means determines a white reference level and a black reference level of the first display apparatus and a white reference level and a black reference level of the second display apparatus, using the first information transmitted from the first display apparatus to the image processing apparatus and the second information transmitted from the second display apparatus to the image processing apparatus, the communication means transmits a white reference level and a black reference level of the first display apparatus to the first display apparatus, and transmits a white reference level and a black reference level of the second display apparatus to the second display apparatus.

5. The display system according to claim 1, wherein the first display apparatus includes a projector, and the second display apparatus includes a projector.

6. An image processing apparatus comprising:
 a first generating means for generating partial images from an entire image to be displayed;
 a second generating means for generating a reduced image by reducing the entire image to be displayed; and
 a communication means for transmitting a first partial image to a first display apparatus, transmitting a second partial image that is different from the first partial image to a second display apparatus, and transmitting the reduced image to the first display apparatus and the second display apparatus,
 wherein the first display apparatus is configured to receive the first partial image from the image processing apparatus, receive the reduced image from the image processing apparatus, use the reduced image to process the first partial image, and display the processed first partial image,
 wherein the second display apparatus is configured to receive the second partial image from the image processing apparatus, receive the reduced image from the image processing apparatus, use the reduced image to process the second partial image, and display the processed second partial image,
 wherein the image processing apparatus includes controlling means for controlling a white reference level and a black reference level of the first display apparatus and a white reference level and a black reference level of the second display apparatus, using first information relating to a display capability of the first display apparatus and second information relating to a display capability of the second display apparatus, and
 wherein the first information is transmitted from the first display apparatus to the image processing apparatus, and the second information is transmitted from the second display apparatus to the image processing apparatus.

7. The image processing apparatus according to claim 6, wherein the first display apparatus is configured to use the reduced image to adjust gamma characteristics of the first partial image, and
 wherein the second display apparatus is configured to use the reduced image to adjust gamma characteristics of the second partial image.

8. The image processing apparatus according to claim 6, wherein the first display apparatus is configured to use the reduced image to adjust tone characteristics of the first partial image, and wherein the second display apparatus is configured to use the reduced image to adjust tone characteristics of the second partial image.

9. The image processing apparatus according to claim 6, wherein after the controlling means determines a white reference level and a black reference level of the first display apparatus and a white reference level and a black reference level of the second display apparatus, using the first information transmitted from the first display apparatus to the image processing apparatus and the second information transmitted from the second display apparatus to the image processing apparatus, the communication means transmits a white reference level and a black reference level of the first display apparatus to the first display apparatus, and transmits a white reference level and a black reference level of the second display apparatus to the second display apparatus.

10. The image processing apparatus according to claim 6, wherein the first display apparatus includes a projector, and the second display apparatus includes a projector.

11. A display system comprising:
a first display apparatus;
a second display apparatus; and
an image processing apparatus,
wherein the image processing apparatus includes a first generating unit that generates partial images from an entire image to be displayed, a second generating unit that generates a reduced image by reducing the entire image to be displayed, and a communication unit that transmits a first partial image to the first display apparatus, transmits a second partial image that is different from the first partial image to the second display apparatus, and transmits the reduced image to the first display apparatus and the second display apparatus,
wherein the first display apparatus is configured to receive the first partial image from the image processing apparatus, receive the reduced image from the image processing apparatus, use the reduced image to process the first partial image, and display the processed first partial image,
wherein the second display apparatus is configured to receive the second partial image from the image processing apparatus, receive the reduced image from the image processing apparatus, use the reduced image to process the second partial image, and display the processed second partial image,
wherein the image processing apparatus includes a controlling unit that controls a white reference level and a black reference level of the first display apparatus and a white reference level and a black reference level of the second display apparatus, using first information relating to a display capability of the first display apparatus and second information relating to a display capability of the second display apparatus, and
wherein the first information is transmitted from the first display apparatus to the image processing apparatus, and the second information is transmitted from the second display apparatus to the image processing apparatus.

12. The display system according to claim 11, wherein the first display apparatus is configured to use the reduced image to adjust gamma characteristics of the first partial image, and
wherein the second display apparatus is configured to use the reduced image to adjust gamma characteristics of the second partial image.

13. The display system according to claim 11, wherein the first display apparatus is configured to use the reduced image to adjust tone characteristics of the first partial image, and
wherein the second display apparatus is configured to use the reduced image to adjust tone characteristics of the second partial image.

14. The display system according to claim 11, wherein after the controlling unit determines a white reference level and a black reference level of the first display apparatus and a white reference level and a black reference level of the second display apparatus, using the first information transmitted from the first display apparatus to the image processing apparatus and the second information transmitted from the second display apparatus to the image processing apparatus, the communication unit transmits a white reference level and a black reference level of the first display apparatus to the first display apparatus, and transmits a white reference level and a black reference level of the second display apparatus to the second display apparatus.

15. The display system according to claim 11, wherein the first display apparatus includes a projector, and the second display apparatus includes a projector.

16. An image processing apparatus comprising:
a first generating unit that generates partial images from an entire image to be displayed;
a second generating unit that generates a reduced image by reducing the entire image to be displayed; and
a communication unit that transmits a first partial image to a first display apparatus, transmits a second partial image that is different from the first partial image to a second display apparatus, and transmits the reduced image to the first display apparatus and the second display apparatus,
wherein the first display apparatus is configured to receive the first partial image from the image processing apparatus, receive the reduced image from the image processing apparatus, use the reduced image to process the first partial image, and display the processed first partial image,
wherein the second display apparatus is configured to receive the second partial image from the image processing apparatus, receive the reduced image from the image processing apparatus, use the reduced image to process the second partial image, and display the processed second partial image,
wherein the image processing apparatus includes a controlling unit that controls a white reference level and a black reference level of the first display apparatus and a white reference level and a black reference level of the second display apparatus, using first information relating to a display capability of the first display apparatus and second information relating to a display capability of the second display apparatus, and
wherein the first information is transmitted from the first display apparatus to the image processing apparatus, and the second information is transmitted from the second display apparatus to the image processing apparatus.

17. The image processing apparatus according to claim 16, wherein the first display apparatus is configured to use the reduced image to adjust gamma characteristics of the first partial image, and
wherein the second display apparatus is configured to use the reduced image to adjust gamma characteristics of the second partial image.

18. The image processing apparatus according to claim 16, wherein the first display apparatus is configured to use the reduced image to adjust tone characteristics of the first partial image, and wherein the second display apparatus is configured to use the reduced image to adjust tone characteristics of the second partial image.

19. The image processing apparatus according to claim 16, wherein after the controlling unit determines a white reference level and a black reference level of the first display apparatus and a white reference level and a black reference level of the second display apparatus, using the first information transmitted from the first display apparatus to the image processing apparatus and the second information transmitted from the second display apparatus to the image processing apparatus, the communication unit transmits a white reference level and a black reference level of the first display apparatus to the first display apparatus, and transmits a white reference level and a black reference level of the second display apparatus to the second display apparatus.

20. The image processing apparatus according to claim 16, wherein the first display apparatus includes a projector, and the second display apparatus includes a projector.

\* \* \* \* \*